(12) United States Patent
Thomas et al.

(10) Patent No.: US 8,612,097 B2
(45) Date of Patent: Dec. 17, 2013

(54) AIRBAG DEPLOYMENT

(75) Inventors: Scott D. Thomas, Novi, MI (US); Kathryn E. Koski, New Baltimore, MI (US); Lawrence A. Kwiecinski, Leonard, MI (US); Anthony G. Melocchi, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 395 days.

(21) Appl. No.: 12/956,486

(22) Filed: Nov. 30, 2010

(65) Prior Publication Data

US 2012/0065843 A1 Mar. 15, 2012

Related U.S. Application Data

(60) Provisional application No. 61/382,617, filed on Sep. 14, 2010.

(51) Int. Cl.
*B60R 22/00* (2006.01)

(52) U.S. Cl.
USPC .......................................................... 701/45

(58) Field of Classification Search
USPC .......................................................... 701/45
See application file for complete search history.

(56) References Cited

U.S. PATENT DOCUMENTS

| | | | |
|---|---|---|---|
| 2004/0167696 A1* | 8/2004 | Ogata et al. ...................... | 701/45 |
| 2005/0107933 A1* | 5/2005 | Kuroda et al. ................... | 701/45 |
| 2007/0096447 A1* | 5/2007 | Tabe .............................. | 280/735 |
| 2007/0170707 A1* | 7/2007 | Sato et al. .................... | 280/730.2 |
| 2008/0234890 A1* | 9/2008 | Okada et al. ...................... | 701/35 |
| 2008/0315565 A1* | 12/2008 | Kawabe et al. ............. | 280/728.2 |
| 2009/0200775 A1* | 8/2009 | Sugimoto et al. ........... | 280/730.2 |
| 2009/0283998 A1* | 11/2009 | Kim ............................ | 280/743.2 |
| 2010/0063686 A1* | 3/2010 | Kohler ............................ | 701/45 |
| 2010/0121536 A1* | 5/2010 | Wang et al. ...................... | 701/45 |
| 2011/0285114 A1* | 11/2011 | Ohara et al. ............... | 280/730.1 |

FOREIGN PATENT DOCUMENTS

| | | |
|---|---|---|
| DE | 102005042203 A1 | 3/2007 |
| DE | 102007051282 A1 | 4/2009 |
| DE | 102008005159 A1 | 7/2009 |
| JP | 2009214689 A | 9/2009 |

OTHER PUBLICATIONS

German Office Action dated Jun. 18, 2012.
Office Action from Chinese Patent Office for application CN 201110347723.5, mailed Oct. 8, 2013, 5 pages.

\* cited by examiner

*Primary Examiner* — Hussein A. Elchanti
(74) *Attorney, Agent, or Firm* — Cantor Colburn LLP

(57) ABSTRACT

A method of deploying a side impact airbag is provided. The method includes selectively determining a delay time based on an impact type, where the delay time associated with an impact on a first side is different than the delay time associated with an impact on a second side; and selectively generating a control signal to at least one of deploy and not deploy the side impact airbag based on the delay time.

20 Claims, 5 Drawing Sheets

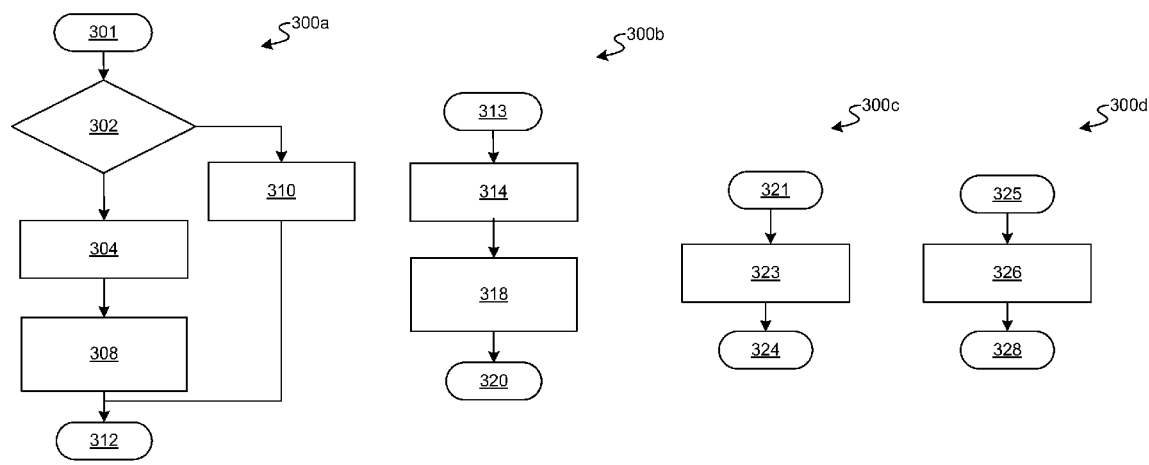
FIG. 5A  FIG. 5B  FIG. 5C  FIG. 5D

AIRBAG DEPLOYMENT

CROSS-REFERENCES TO RELATED APPLICATIONS

This patent application claims priority to U.S. Provisional Patent Application Ser. No. 61/382,617 filed Sep. 14, 2010 which is incorporated herein by reference in its entirety.

FIELD

The subject invention relates to airbags of a vehicle and more particularly to control methods and systems for deploying an airbag.

BACKGROUND

Specifically designed side impact airbags are typically provided in vehicles to restrain an occupant's head and/or upper body during a collision. The side airbags are typically deployed or not deployed based on a location, direction, and severity of the impact on the vehicle in the collision. In some cases, simply deploying or not deploying the airbag may not provide optimal airbag performance for an occupant. Accordingly, it is desirable to provide tailorable airbag deployment systems and methods.

SUMMARY

In one exemplary embodiment, a method of deploying a side impact airbag is provided. The method includes selectively determining a delay time based on an impact type, where the delay time associated with an impact on a first side is different than the delay time associated with an impact on a second side; and selectively generating a control signal to at least one of deploy and not deploy the side impact airbag based on the delay time.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which:

FIGS. 3, 4A-4C, and 5A-5D are flowcharts illustrating airbag deployment methods in accordance with exemplary embodiments.

DESCRIPTION OF THE EMBODIMENTS

Figure 1:
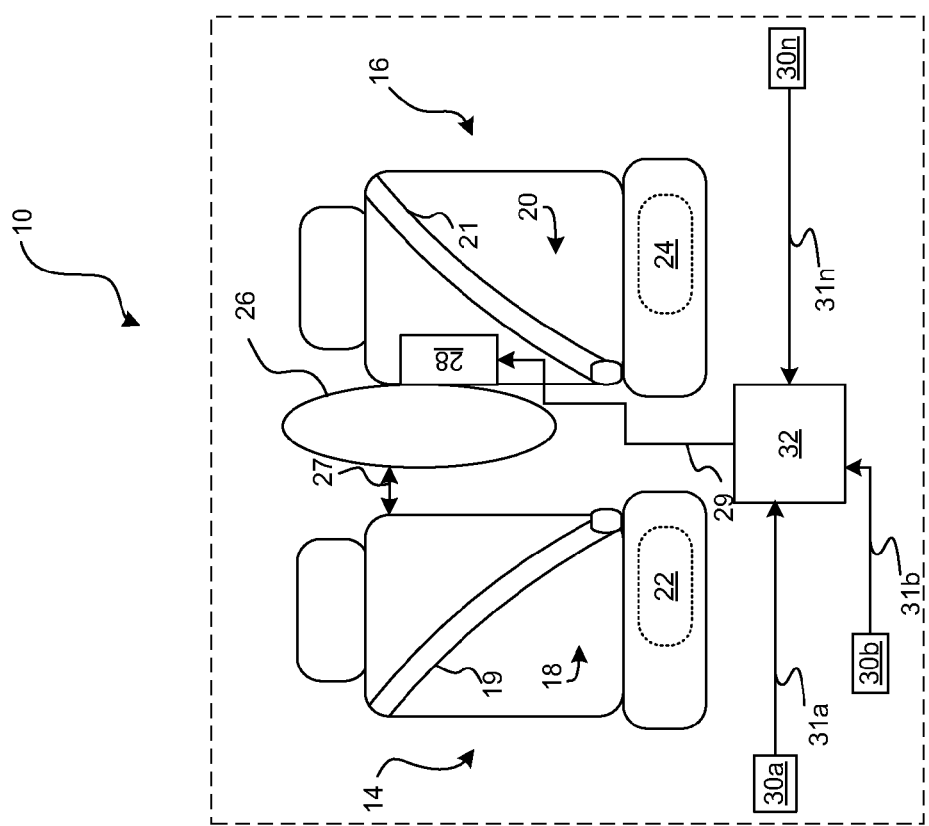
FIG. 1 is a functional block diagram of a vehicle including an airbag deployment system in accordance with exemplary embodiments.

The following description is merely exemplary in nature and is not intended to limit the present disclosure, application, or uses. It should be understood that throughout the drawings, corresponding reference numerals indicate like or corresponding parts and features. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, a vehicle that includes an airbag deployment system is shown generally at 10. The airbag deployment system is associated with at least two seats 14 and 16 of the vehicle 10. For exemplary purposes, the seat 14 will be referred to as a passenger seat and seat 16 will be referred to as a driver seat. As can be appreciated, the airbag deployment system of the present disclosure can be applicable to any seat configuration in the vehicle 10 including two or more seats (e.g., can be applicable to a three across seating orientation) and is not limited to the present example.

In various embodiments, at least one, if not both of the two seats 14, 16 may be associated with a seatbelt system 18, 20 respectively. The seatbelt system 18, 20 includes one or more sensors that detect a fastened seatbelt 19, 21 and that generate a sensor signal based thereon. In various embodiments, at least one, if not both, of the two seats 14, 16 may include an occupant detection system 22, 24, respectively. The occupant detection system 22, 24 includes one or more sensors that detect the presence of an occupant in the seat 14, 16 and that generate a sensor signal based thereon. In the following examples, the passenger seat 14 includes at least the occupant detection system 22 and seatbelt system 18 and the driver seat 16 includes at least the seatbelt system 20.

The airbag deployment system generally includes one or more airbags 26 and one or more airbag actuation units 28. When the airbag 26 is inactive, the airbag 26 is deflated and may be stored in a first position within one of the two seats 14 or 16, or both seats 14 and 16, or may be disposed within a vehicle roof (not shown), a center console (not shown) or other housing unit (not shown) between the seats 14, 16. When the airbag 26 is active or deployed (as shown), the airbag 26 is inflated to a second position between the two seats 14, 16. The airbag actuation unit 28 includes an inflator that inflates the airbag 26 based on a deployment signal 29. The inflated airbag 26 provides a cushion between two occupants of the vehicle 10 residing in the two seats 14, 16 or provides restraint to a single occupant residing in seat 16 during a collision.

In the example of FIG. 1, a single airbag 26 and a single airbag actuation unit 28 are mounted to the driver seat 16. In this configuration, the airbag 26 may be shorter in cross-vehicle length and may not inflate to the passenger seat 14 leaving a gap 27 between the airbag 26 and the passenger seat 14. For ease of the discussion, the remainder of the disclosure will be discussed in accordance with this exemplary configuration.

As shown in FIG. 1, the vehicle 10 further includes various sensors 30a-30n that detect and measure observable conditions of the vehicle 10. The sensors 30a-30n generate sensor signals 31a-31n based on the observable conditions. In various embodiments, the sensors 30a-30n can include, for example, impact sensors, accelerometers, vehicle speed sensors, rollover sensors, or other vehicle type sensors.

A control module 32 processes one or more sensor signals 31a-31n from the various sensors 30a-30n to determine an impact on an exterior of the vehicle 10. When an impact is determined, the control module 32 selectively generates the deployment signal 29 to the airbag activation unit 28 based on the deployment systems and methods of the present disclosure. Generally speaking, the control module 32 selectively generates the deployment signal 29 with a delay based on impact type and/or a suppression determination. For example, the delay may be used for driver side impacts to allow for the passenger occupant to move cross-vehicle to close the gap and load the airbag. In another example, the delay may further be used to deploy the airbag later in the impact where the airbag will have more pressure for resisting occupant loading before it deflates. In yet another example, the delay may be used to intentionally create an out of phase loading scenario with the driver occupant who will also be loaded by an intruding structure early in a driver side impact.

Figure 2:
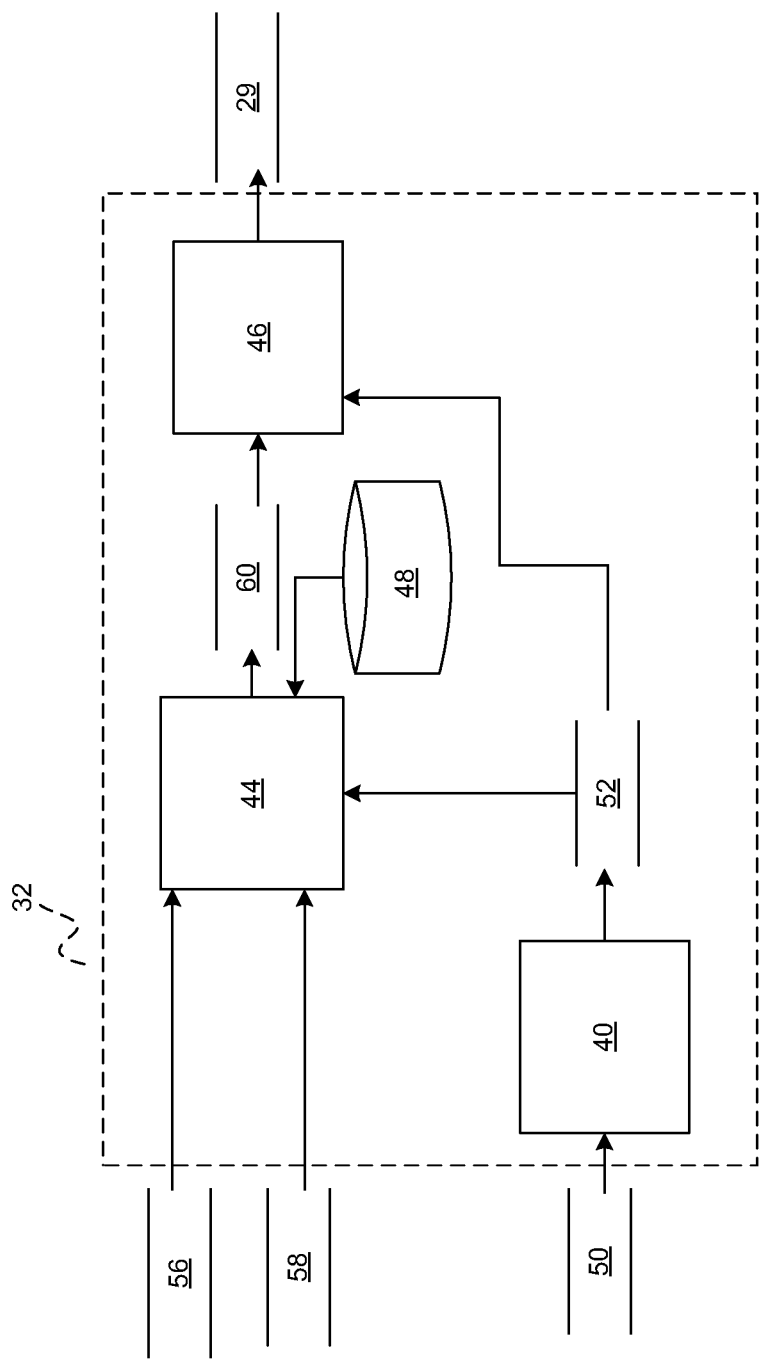
FIG. 2 is a dataflow diagram illustrating a control module of the airbag deployment system in accordance with exemplary embodiments.

Referring now to FIG. 2, a dataflow diagram illustrates the control module 32 in accordance with exemplary embodiments. In various embodiments, the control module 32 can include one or more sub-modules and datastores. As can be appreciated, the sub-modules shown in FIG. 2 may be combined and/or further partitioned to similarly control the deployment of the airbag 26 of the vehicle 10. Portions of the sub-modules may be remotely located such as in sensors 30a-30n (FIG. 1). Inputs to the control module 32 can be received from the sensors 30a-30n of the vehicle 10 (FIG. 1), can be modeled, can be received from other control modules (not shown) within the vehicle 10 (FIG. 1), and/or can be predefined. In various embodiments, the control module 32 includes an impact monitoring module 40, a delay determination module 44, a deployment module 46, and a delay data datastore 48.

The impact monitoring module 40 receives as input impact data 50. The impact data 50 can be generated by the sensors 30a-30n (FIG. 1) of the vehicle 10 (FIG. 1) and/or modeled based on sensor data. The impact monitoring module 40 determines when an impact occurs and determines a type of the impact (impact type 52) based on the impact data 50. In various embodiments, the impact type 52 can be at least one of, a passenger side impact, a driver side impact, a rear impact, a rollover impact, or a front impact.

In various embodiments, the impact type 52 may be determined based on the signal magnitude and duration received. For instance, if the sensors 30a-30n monitoring lateral acceleration indicate accelerations coming from the side of the passenger occupant, a passenger side impact type would be assumed. As can be appreciated, other more complex methods than just evaluating acceleration direction may be utilized to determine the impact type 52. For instance, sensors (30a-30n) that measure acceleration, pressure, contact and other types, along with its calculated derivatives are used to compare deploy and non-deploy events to distinguish the type of crash. The sensors 30a-30n used may provide measurements in a linear direction or in a rotational direction. Finally, the sensors 30a-30n measuring pre-impact parameters such as closing velocity, vehicle speed, wheel speed and other available vehicle data may be used.

The delay determination module 44 receives as input the impact type 52. Based on the impact type 52, the delay determination module 44 selectively determines a delay time 60 for deployment of the airbag 26 (FIG. 1). For example, the delay time 60 can be determined when the impact type 52 indicates a driver side impact and/or a front impact; and for all other impact types, the delay time 60 may be set to zero. The delay time 60 can be based on an estimated time of travel of an occupant relative to the center line of the vehicle (i.e., a center line between the two seats 14, 16 (FIG. 1)). In various embodiments, the delay time 60 can be predetermined and retrieved from the delay data datastore 48. The delay data datastore 48 can store, for example, a delay value or a table of delay values that may be indexed based on, for example, the impact type 52 and/or a severity of the impact. In various embodiments, the term predetermined includes when the values in the delay data datastore 48 are selectable, and are selected when the control module 32 (FIG. 1) is constructed (e.g., as a calibration during programming). In various other embodiments, the delay time 60 can be determined in real-time based on the impact data 50 and/or other vehicle data.

The delay determination module 44 may further receive as input a suppression state 56, and a seatbelt state 58. The suppression state 56 and the seatbelt state 58 can be received from the suppression system 22 (FIG. 1) and the seatbelt system 20 (FIG. 1), respectively. The seatbelt state is typically detected at the seat belt buckle by detecting, for example, if a seatbelt latch plate has been inserted. The seatbelt state 58 indicates whether a seatbelt is buckled and can be, for example, the driver seatbelt 21 (FIG. 1) and can indicate if the driver is belted or not belted. The suppression system may be a passive system mounted in passenger seat 14 or could be a vision based system mounted elsewhere in the vehicle. It could also be a manual switch controlled by vehicle occupants. The suppression state 56 classifies whether an occupant is seated in the passenger seat 14 (FIG. 1) and can determine, for example, passenger seat empty, or passenger seat occupied. Note that the terminology of "empty" can for some systems be expanded to include an occupant size range that includes smaller occupants. Thus the threshold described herein with an "empty" and an "occupied" signaled output can have a varying system and vehicle specific occupant size/mass threshold between these outputs. It is also appreciated that suppression systems can return multiple outputs. Thus, the suppression state 56 can be tailored for any of the signaled outputs with the lower size/mass level output, called "empty" herein also including some level of occupant size/mass.

Based on these inputs 56, 58, the delay determination module 44 may further selectively determine the delay time 60. For example, when the impact type 52 is a driver side impact and the suppression state 56 indicates that an occupant is in the passenger seat and/or the seatbelt state 58 indicates driver not belted, the delay time 60 may be determined using one of the various methods as discussed above. As another example, when the impact type 52 is a passenger side impact, the delay time 60 may be set to zero or a value near zero. In various embodiments, the determination of the delay time 60 based on the suppression state 56 and/or the seatbelt state 58 may be selectively enabled.

The deployment module 46 receives as input the impact type 52, and the delay time 60. Based on the inputs, the deployment module 46 selectively generates the deployment signal 29 to the airbag actuation unit 28 (FIG. 1). For example, the deployment signal 29 may be generated when the impact type 52 is one of the passenger side impact, the driver side impact, the rollover impact (on the top side), and the front impact and when the impact severity is above an associated predetermined severity threshold (i.e., associated with the impact type 52). In various embodiments, the deployment module 46 includes a timer that delays the actual generation of the deployment signal 29 based on the delay time 60. In various embodiments, when the delay time 60 is set to zero, the deployment signal 29 is generated without delay.

Referring now to FIGS. 3, 4A-4D, and 5A-5D and with continued reference to FIGS. 1 and 2, flowcharts illustrate airbag deployment methods that can be performed by the control module 32. As can be appreciated in light of the disclosure, the order of operation within the methods is not limited to the sequential execution as illustrated in FIGS. 3, 4A-4D, and 5A-5D, but may be performed in one or more varying orders as applicable and in accordance with the present disclosure.

As can be appreciated, the airbag deployment methods can be scheduled to run based on predetermined events and/or can run continually or simultaneously during operation of the vehicle 10 (FIG. 1) (as shown).

Figure 3:
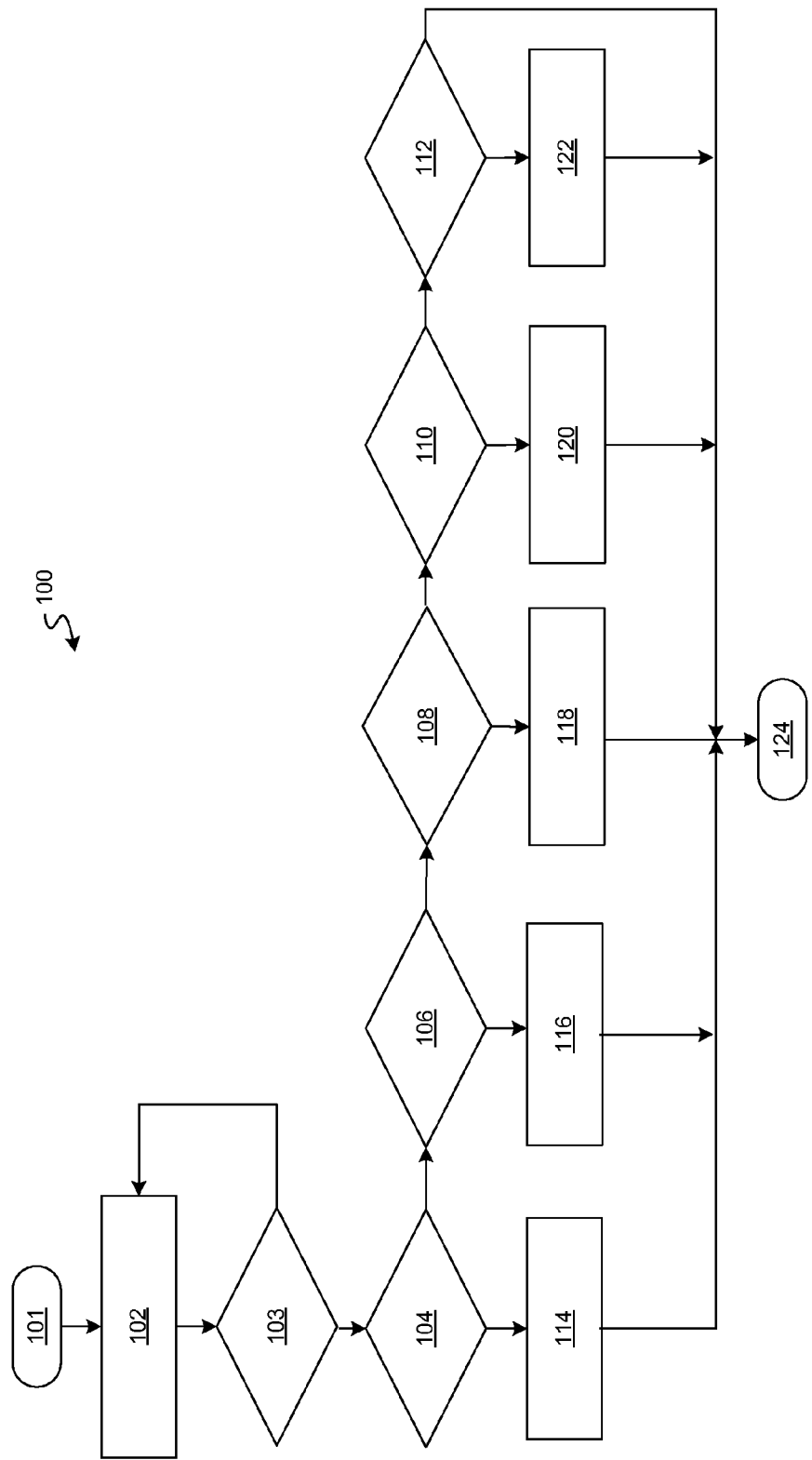

With specific reference now to FIG. 3, a general airbag deployment method is shown generally at 100. In one example, the method may begin at 101. The impact data 50 is monitored at 102. Based on the impact data 50, it is determined whether the impact severity is above a threshold at 103. If the impact severity is above a threshold at 103, the impact type 52 is determined at 104-112. Otherwise the method continues to monitor the impact data 50 at 102.

Based on the impact type 52 at 104-112, deployment methods are performed at 114-122. For example, when the impact type 52 is the passenger side impact at 104, the deployment signal 29 is generated at 114 to deploy the airbag 26. In another example, when the impact type 52 is the driver side impact at 106, the deployment signal 29 is generated based on driver side impact methods as will be discussed with regard to 200*a* through 200*c* in FIGS. 4A-4C at 116. In yet another example, when the impact type 52 is the rear impact at 108, the deployment signal 29 is not generated at 118 such that the airbag 26 is not deployed. However, if deployment is desired for the rear impact, deployment can be provided using similar methods to the other impact types discussed herein.

In still another example, when the impact type 52 is the rollover impact at 110, the deployment signal 29 is generated at 120 to deploy the airbag 26 or deployed using similar methods to the other impact types discussed herein. In still another example, when the impact type 52 is the front impact at 112, the deployment signal 29 may be generated based on frontal impact deployment methods as will be discussed with regard to 300*a* through 300*d* in FIGS. 5A-5D at 122. The method may end at 124.

Figure 4A:
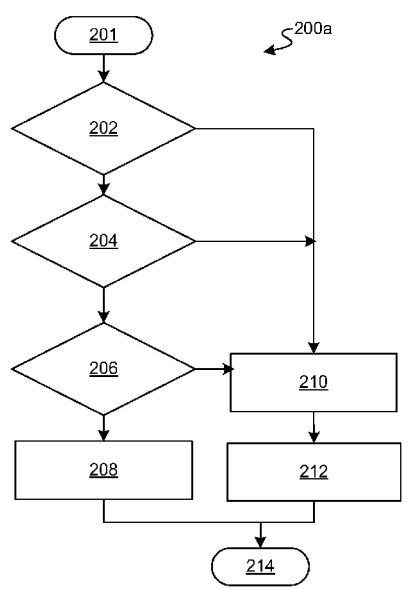
Figure 4B:
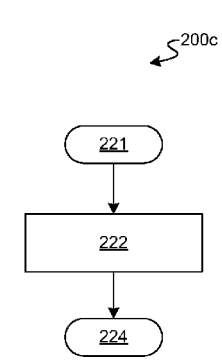
Figure 4C:
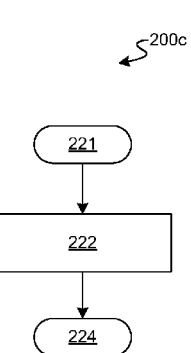

With specific reference now to FIGS. 4A-4C, exemplary driver side impact methods are shown generally at 200*a*-200*c*. Any one of these driver side impact deployment methods 200*a*-200*c* may be performed when the impact type 52 indicates driver side impact. In various embodiments, the usage of one of these methods 200*a*-200*c* may be selectable, and the selection may be made when the control module 32 (FIG. 1) is constructed (e.g., during programming). In various other embodiments, one of the methods 200*a*-200*c* may be included in the control module 32 (FIG. 1).

With specific reference to FIG. 4A, the method 200*a* may begin at 201. It is determined whether the suppression logic has been enabled at 202. When the suppression logic has been enabled at 202, the suppression state 56 and the seatbelt state 58 are evaluated at 204 and 206. When the suppression state 56 indicates passenger seat empty at 204 and the seatbelt state 58 indicates the driver belted, the deployment signal 29 is not generated at 208 such that the airbag 26 is not deployed. When the suppression logic has been enabled at 202, however, the suppression state 56 indicates seat occupied at 204 the delay time 60 is determined at 210 and the deployment signal 29 is generated according to the delay time 60 at 212 to deploy the airbag 26. When the suppression logic has been enabled at 202, the suppression state 56 indicates the seat is empty at 204, and the seatbelt state 58 indicates driver not belted at 206, the delay time 60 is determined at 210 and the deployment signal 29 is generated according to the delay time 60 at 212 to deploy the airbag 26. Thereafter, the method may end at 214.

When, the suppression logic has not been enabled at 202, the delay time 60 is determined at 210 and the deployment signal 29 is generated based only on the delay time 60 at 212 to deploy the airbag 26. Thereafter, the method may end at 214.

As can be appreciated, for vehicles that are not equipped with a seatbelt system or for other reasons, the evaluation of the seatbelt state at 206 may be removed from the method. Thus, when an empty seat is detected at 204, the deployment signal is not generated at 208 such that the airbag 26 is not deployed.

With specific reference to FIG. 4B, alternatively, the suppression enable option may not be included in the method. In this example of 200*b*, the method may begin at 215. The method begins with determining the delay time 60 as discussed above at 216; and the deployment signal 29 is generated after the delay to enable the airbag 26 at 218. Thereafter, the method may end at 220.

With specific reference to FIG. 4C, alternatively, the deployment signal 29 may be simply generated with no delay. For example, at 221 the method may begin. The deployment signal 29 is generated at 222 such that the airbag 26 is deployed (i.e., with no delay) and the method may end at 224.

Note that the delay option in FIGS. 4A and 4B would likely be coupled with example airbag 26 of FIG. 1, since the passenger occupant has time to move cross vehicle before he/she contacts the airbag 26.

With reference now to FIGS. 5A-5D, front impact deployment methods are shown generally at 300*a*-300*d*. Any one of these front impact deployment methods may be performed when the impact type 52 indicates front impact and the deployment threshold has been exceeded. For purposes of the illustrations of FIGS. 5A-5D, the assumption that the deployment threshold that has been exceeded is the airbag second stage threshold. In this manner, the airbag 26 will only be considered for deployment for severe impacts where combined first stage and second stage output frontal airbags would also be deployed. In various embodiments, the usage of one of these methods 300*a*-300*d* may be selectable, and the selection may be made when the control module 32 (FIG. 1) is constructed (e.g., during programming). In various other embodiments, one of the methods 200*a*-200*c* may be included in the control module 32 (FIG. 1).

With specific reference to FIG. 5A, the method 300*a* may begin at 301, an enable option for deploying the airbag 26 during front impacts is evaluated at 302. If the option has been enabled at 302, the delay time 60 is determined as discussed above at 304. As can be appreciated, the delay time 60 used in this frontal impact mode may or may not be a different delay than the delay time 60 used in the driver side impact mode The deployment signal 29 is generated after the delay to enable the airbag 26 at 308. If, however, the option for deploying the airbag 26 is not enabled at 302, the deployment signal 29 is not generated at 310 such that the airbag 26 is not deployed. Thereafter the method may end at 312.

With specific reference to FIG. 5B, alternatively, the enable option may not be included in the method. For example, the method 300*b* may begin at 313. The delay time 60 is determined as discussed above at 314. As can be appreciated, the delay time 60 for frontal impacts may or may not be a different delay than the delay time 60 used in the driver side impact mode. Once the delay time 60 is determined at 314, the deployment signal 29 is generated after the delay time 60 expires to enable the airbag 26 at 318. Thereafter the method may end at 320.

With specific reference to FIGS. 5C and 5D, alternatively, the deployment signal 29 may be either generated or not generated during front impacts. For example, at 321 the method 300*c* may begin. The deployment signal 29 is generated at 323 such that the airbag 26 is deployed (i.e., with no delay); and the method may end at 324.

In another example, the method 300d may begin at 325. The deployment signal 29 is generated at 326 such that the airbag 26 is not deployed; and the method may end at 328.

As another alternative to the methods presented in FIGS. 3, 5A and 5B, a single stage threshold or first stage threshold may be used instead of a second stage threshold for frontal impact types. For systems with more than two thresholds for frontal airbag deployment, other thresholds may be used. In addition, if angle frontal impacts can be distinguished from flat barriers, methods similar to those provided in FIGS. 4A-4C or FIGS. 5A-5D may be used. Finally, if multiple stage airbags are used for airbag 26 a second threshold and a second delay time for the second firing loop in the inflator may be provided in the method after the first threshold and the first delay time. The second delay time may be configured to deploy for restraint purposes or to dispose of the propellant from the inflator after the timeframe for restraint has passed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of deploying a side impact airbag of a vehicle, comprising:
   at least one airbag that is disposed between a first occupant seating position of a first side of the vehicle and a second occupant seating position of a second side of the vehicle; and
   selectively determining a delay time based on an impact type, a suppression determination, and a determination of occupied seats in a vehicle, where the delay time associated with an impact on a first side of the vehicle is different than the delay time associated with an impact on a second side of the vehicle; and
   selectively generating a control signal via a control module having a processor to at least one of deploy and not deploy the side impact airbag based on the delay time and said deployment of said airbag is responsive to said delay time for each side of the vehicle so that deployment time of said airbag on the first side of the vehicle is different than deployment time of said airbag on the second side of the vehicle.

2. The method of claim 1 wherein at least one of the selectively determining the delay time and the selectively generating the control signal is further based on at least one of a suppression state for rendering the suppression determination, and a seatbelt state.

3. The method of claim 2 wherein the suppression state indicates whether an occupant is seated in a seat on the second side.

4. The method of claim 2 wherein the seatbelt state indicates whether an occupant is belted into a seat on the first side of the vehicle.

5. The method of claim 2 wherein the first side of the vehicle is a driver side and the second side of the vehicle is a passenger side.

6. The method of claim 5 wherein at least one of the selectively determining the delay time and the selectively generating the control signal occurs when at least one of:
   an impact is on the driver side;
   the impact is on the driver side and the suppression state indicates the occupant is seated on the passenger side;
   the impact is on the driver side and the seatbelt state indicates the occupant is belted and the suppression state indicates the occupant is not seated on the passenger side; and
   the seatbelt state indicates that an occupant is not belted and the suppression state indicates that an occupant is not seated on the passenger side.

7. The method of claim 1 wherein the first side of the vehicle is a first passenger side and the second side of the vehicle is a second passenger side that is opposite of the first passenger side.

8. The method of claim 1 wherein a delay time associated with an impact on a third side of the vehicle is different than at least one of the delay time associated with the impact on the first side of the vehicle and the delay time associated with the impact on the second side of the vehicle.

9. The system of claim 8 wherein the third side of the vehicle is at least one of a front side a rear side, and a top side.

10. An airbag deployment system, comprising:
    at least one airbag that is disposed between a first occupant seating position of a first side of a vehicle and a second occupant seating position of a second side of the vehicle; and
    an actuation unit responsive to the control module such that the actuation unit deploys the at least one airbag after a delay time occurs, wherein at least one of the delay time and the deployment is selectively determined based on an impact type a suppression determination, and a determination of occupied seats in the vehicle, where the delay time associated with deployment on the first side of the vehicle is different than the delay time associated with deployment on the second side of the vehicle.

11. The system of claim 10 further comprising a delay determination module that selectively determines the delay time based on the impact type.

12. The system of claim 11 wherein the delay determination module further determines the delay time based on at least one of a suppression state, and a seatbelt state.

13. The system of claim 11 further comprising a deployment module that selectively generates a deployment signal based on the delay time, and wherein the actuation unit deploys the airbag based on the deployment signal.

14. The system of claim 10 wherein the first occupant seating position is a passenger seating position.

15. The system of claim 14 wherein the second occupant seating position is a driver seating position.

16. The system of claim 14 wherein the second occupant seating position is a passenger seating position.

17. The system of claim 10 wherein an impact on a third side of the vehicle not associated with the first occupant seating position and the second occupant seating position is different than at least one of the delay time associated with the impact on the first side of the vehicle and the delay time associated with the impact on the second side of the vehicle.

18. The system of claim 17 wherein the third side of the vehicle is at least one of a front side, a rear side, and a top side.

19. A vehicle, comprising:
    a plurality of airbags wherein at least one airbag is disposed between a first occupant seating position of a first side of the vehicle and a second occupant seating position of a second side of the vehicle;

a control module that selectively determines at least one of a decision to deploy and a delay time based on an impact type, where the delay time associated with an impact on the first side is different than the delay time associated with an impact on the second side and deployment of the airbag on a first side of the vehicle is different than deployment time of the airbag on a second side of the vehicle an actuation unit that deploys the at least one airbag after the delay time occurs.

20. The vehicle of claim 19 wherein the control module further determines the at least one of decision to deploy and delay time based on at least one of a suppression state, and a seatbelt state.

\* \* \* \* \*